United States Patent
Bellert

(10) Patent No.: US 9,898,683 B2
(45) Date of Patent: Feb. 20, 2018

(54) ROBUST METHOD FOR TRACING LINES OF TABLE

(71) Applicant: Konica Minolta Laboratory U.S.A., Inc., San Mateo, CA (US)

(72) Inventor: Darrell Eugene Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 15/169,485

(22) Filed: May 31, 2016

(65) Prior Publication Data

US 2017/0344847 A1 Nov. 30, 2017

(51) Int. Cl.
*G06K 9/46* (2006.01)
*G06K 9/48* (2006.01)
*G06K 9/74* (2006.01)
*G06K 9/00* (2006.01)

(52) U.S. Cl.
CPC .......... *G06K 9/469* (2013.01); *G06K 9/4633* (2013.01); *G06K 9/481* (2013.01); *G06K 9/74* (2013.01); *G06K 9/00449* (2013.01); *G06K 2209/01* (2013.01); *G06K 2209/03* (2013.01)

(58) Field of Classification Search
CPC ................................................. G06K 9/00449
See application file for complete search history.

(56) References Cited

U.S. PATENT DOCUMENTS 5,841,903 A * 11/1998 Kikuchi ................ G06K 9/342
382/173
2009/0245654 A1 10/2009 Xing et al.

* cited by examiner

*Primary Examiner* — Brian P Werner
(74) *Attorney, Agent, or Firm* — Osha Liang LLP

(57) ABSTRACT

A method for image processing includes obtaining a mask of a stroke from an image and identifying a plurality of cross edges for the stroke based on the mask and a reference line. The plurality of cross edges includes a group of adjacent cross edges that intersect the reference line. The method further includes (a) calculating a first vector based on positions of at least two of the cross edges in the group, (b) expanding the group, based on the first vector, to include cross edges adjacent to the group that do not intersect the reference line, (c) calculating a second vector based on positions of at least two of the cross edges in the expanded group, and (d) expanding the expanded group, based on the second vector, to include a second group of adjacent cross edges nearby the expanded group that do not intersect the reference line.

21 Claims, 12 Drawing Sheets

| | |
|---|---|
| 01 | Build the Hough line CrossEdgeSet |
| 02 | Initialize the RawLine to the largest collection of connected edges in the Hough line CrossEdgeSet. |
| 03 | Expand the edges of the RawLine in either direction, using the *TrailingMomentum()*. |
| 04 | Subtract the newly expanded edges of the RawLine from the Hough line CrossEdgeSet. |
| 05 | Repeat while the Hough line CrossEdgeSet still has edges: |
| 06 |     Locate the closest group of continuous edges in the Hough line CrossEdgeSet to the existing RawLine. |
| 07 |     Expand the closest group in either direction in the same fashion as LINE 03 above. |
| 08 |     Determine if the extended closest group and the existing RawLine can be merged. |
| 09 |     If so, merge the expand closest group into the RawLine. |
| 10 |     Subtract the extended closest group from the Hough line CrossEdgeSet. |
| 11 | // Expand the RawLine at either end: |
| 12 | Compute the midpoint of the *ClosestGoodEdge()* to the end. |
| 13 | Compute the *TrailingMomentum()* at the end. |
| 14 | Repeat while the midpoint is within the bounds of the mask: |
| 15 |     Increment the midpoint by one pixel along the direction of the momentum. |
| 16 |     Look for a CrossEdge that is not part of the RawLine at the current midpoint. |
| 17 |     If a CrossEdge is found, then: |
| 18 |         Add it to a new CrossEdgeSet and expand in either direction in a similar fashion as LINE 03 above. |
| 19 |         Determine if the expanded new CrossEdgeSet and the existing RawLine can be merged. If so: |
| 20 |             Merge the expanded closest group into the RawLine. |
| 21 |             Compute the midpoint of the *ClosestGoodEdge()* to the new end of the RawLine. |
| 22 |             Compute the *TrailingMomentum()* at the end. |
| 23 | // Look for additional edges that might be added within the interior of the RawLine. |
| 24 | Repeat for every possible cross edge C from one end of the RawLine to the other: |
| 25 |     If the RawLine is missing a CrossEdge at C, then: |
| 26 |         Continue searching until a non-empty CrossEdge is found to discover a gap G. |
| 27 |         Locate the *ClosestGoodEdge()* at either side of G, naming the cross edges P and Q. |
| 28 |         Construct a line M that goes from the midpoint of P to the midpoint of Q. |
| 29 |         Using a window centered on M that is as wide as the upper bound of *WidthTolerances()*, search for CrossEdges along M incrementally moving outwards from M. |
| 30 |         If a CrossEdge is found, add it to the RawLine. |
| 31 |     If the RawLine has a CrossEdge at C and the width of the CrossEdge is less than the upper bound of *WidthTolerances()*, then: |
| 32 |         Compute the number of expected pixels E which is the CrossEdge width subtracted from the upper bound of *WidthTolerances()*. |
| 33 |         Scan along the CrossEdge from both ends E pixels looking for additional CrossEdges. |
| 34 |         If an additional CrossEdge is found and the width of the union of the two CrossEdges is less than the upper bound of *WidthTolerances()*, then replace the CrossEdge with the union. |
| 35 | // Remove and interpolate through intersections. |
| 36 | Repeat for every intersection: |
| 37 |     Locate an intersection. |
| 38 |     If an intersection is located, remove it from the RawLine, and add an interpolated set of CrossEdges through the intersection. |

FIG. 5

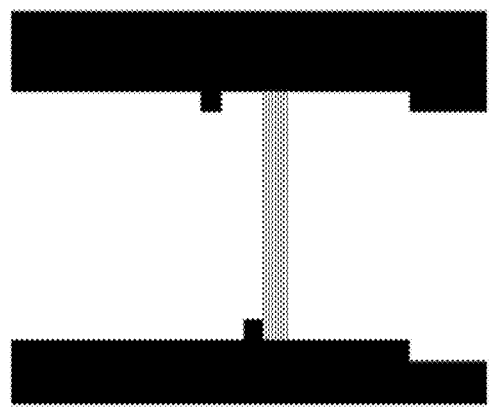
FIG. 6
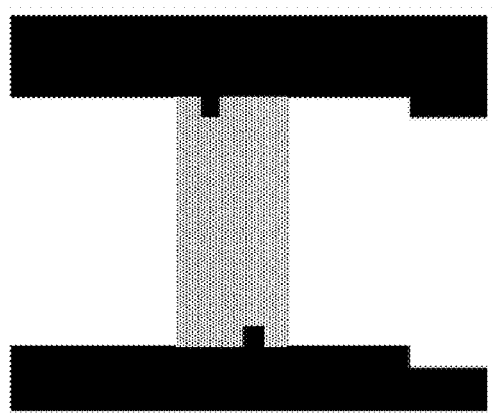
FIG. 7
```
orientation = HORZ
num_edges = 5
width_min = 11
width_max = 12
width_mode = 12
mode_count = 3
width_mean = 11.6
histogram = (11[2] 12[3])
beg = 9
end = 13
probable_line_width_min = 11
probable_line_width_max = 12
```
FIG. 8

ROBUST METHOD FOR TRACING LINES OF TABLE

BACKGROUND

Writing boards such as whiteboards and blackboards are frequently used in many different settings (e.g., academic, corporate, non-profit, residential, etc.). Various content including text, drawings, tables, charts, and graphs may be drawn or placed on the writing boards for lectures, training, brainstorming sessions, etc.

In order to electronically memorialize these ideas, a photograph of the writing board may be taken. Further, image processing such as optical character recognition (OCR), stroke recognition, and reconstruction may be executed to extract the contents of the writing board from the image.

To recognize the content of a table handwritten on a writing board, the image processor or image processing software must locate the pixels that contribute to the "intent" of the table line along with various attributes of the table geometry, such as stroke width and line color. Once the cells of the table are identified, the content included in the cells (e.g., text) can be sent to a recognition module (e.g., OCR module).

However, some artifacts from the handwriting process and certain lighting conditions when the image of the writing board is taken may result in low quality input to the image processor. The low quality input can be seen when a mask of the input image is generated. For example, the writing board shown in FIG. 32 has at least three areas A1, A2, and A3 with irregularities. The area A1 shows a faded portion of a horizontal stroke of a marker or pen on the writing board caused by an intersecting vertical stroke. The area A2 shows where the marker itself faded during the stroke. The area A3 shows fading in the middle of the stroke. These irregularities can be captured in a mask (A1', A2', and A3') as shown in FIG. 33. Other irregularities may also be found in the mask, such as a non-straight line, lines that curve at one end, finger smudges that erase parts of a line, marks made with a low-ink or dried up marker, and faded marks from a previous drawing that show up on the current image.

To recognize the geometry of the hand-drawn table on the writing board, such irregularities found in the mask should be considered, and the pixels that contribute to the intent of the line should be identified properly and precisely.

SUMMARY

In general, in one aspect, the invention relates to a method for image processing. The method comprises: obtaining a mask of a stroke from an image; identifying a plurality of cross edges for the stroke based on the mask and a reference line drawn on the mask, wherein the plurality of cross edges comprises a group of adjacent cross edges that intersect the reference line; expanding the group, comprising: (a) calculating a first vector based on positions of at least two of the cross edges in the group; and (b) expanding the group, based on the first vector, to include cross edges adjacent to the group that do not intersect the reference line; and expanding the expanded group, comprising: (c) calculating a second vector based on positions of at least two of the cross edges in the expanded group; and (d) expanding the expanded group, based on the second vector, to include a second group of adjacent cross edges nearby the expanded group that do not intersect the reference line.

In one or more embodiments, nearby cross edges include cross edges that are both adjacent to and non-adjacent to the expanded group. For example, in one or more embodiments, the second group of adjacent cross edges nearby the expanded group in the step (d) are separated from the expanded group by no more than the shorter of a length of the second group and a length of the expanded group. Further, in one or more embodiments, the length of the group is the distance from the position of the first cross edge to the position of the last cross edge.

In general, in one aspect, the invention relates to a non-transitory computer readable medium (CRM) storing computer readable program code embodied therein. The code: obtains a mask of a stroke from an image; identifies a plurality of cross edges for the stroke based on the mask and a reference line drawn on the mask, wherein the plurality of cross edges comprises a group of adjacent cross edges that intersect the reference line; expands the group by: (a) calculating a first vector based on positions of at least two of the cross edges in the group; and (b) expanding the group, based on the first vector, to include cross edges adjacent to the group that do not intersect the reference line; and expanding the expanded group by: (c) calculating a second vector based on positions of at least two of the cross edges in the expanded group; and (d) expanding the expanded group, based on the second vector, to include a second group of adjacent cross edges nearby the expanded group that do not intersect the reference line.

In general, in one aspect, the invention relates to an image processing system. The image processing system comprises: a memory; and a processor that obtains a mask of a stroke from an image; identifies a plurality of cross edges for the stroke based on the mask and a reference line drawn on the mask, wherein the plurality of cross edges comprises a group of adjacent cross edges that intersect the reference line; expands the group by: (a) calculating a first vector based on positions of at least two of the cross edges in the group; and (b) expanding the group, based on the first vector, to include cross edges adjacent to the group that do not intersect the reference line; and expanding the expanded group by: (c) calculating a second vector based on positions of at least two of the cross edges in the expanded group; and (d) expanding the expanded group, based on the second vector, to include a second group of adjacent cross edges nearby the expanded group that do not intersect the reference line.

Other aspects of the invention will be apparent from the following description and the appended claims.

BRIEF DESCRIPTION OF DRAWINGS

FIG. 5 shows an algorithm to trace a stroke in accordance with one or more embodiments of the invention.

FIGS. 6, 7, and 8 show an implementation example in accordance with one or more embodiments of the invention.

DETAILED DESCRIPTION

Figure 1:
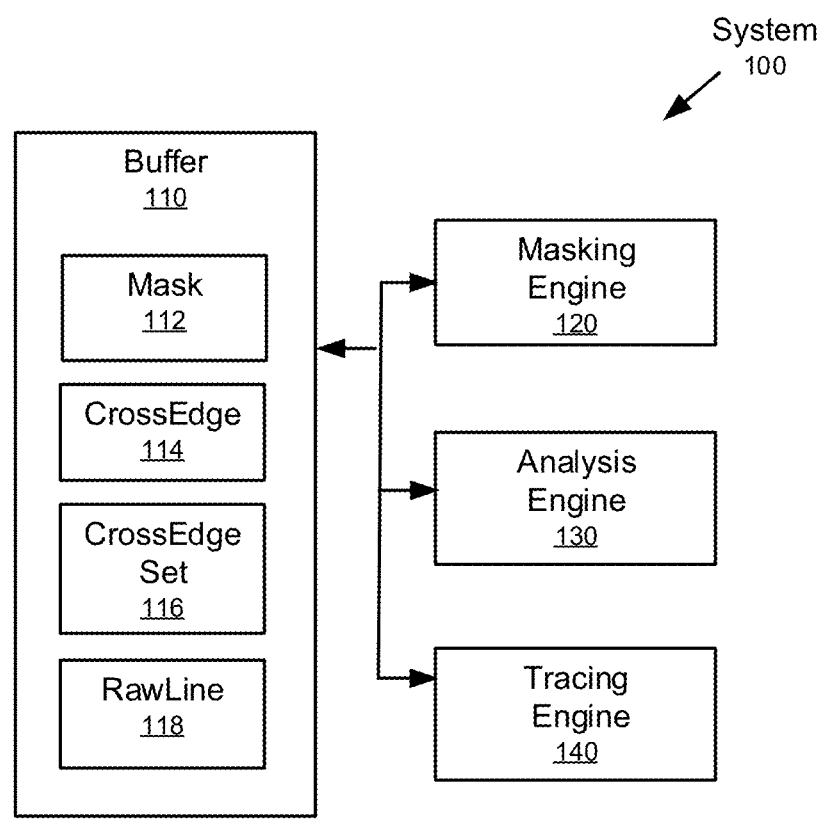
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention generally provide a method, a non-transitory computer readable medium (CRM), and a system for image processing, e.g., a process for tracing a table line.

Figure 32:
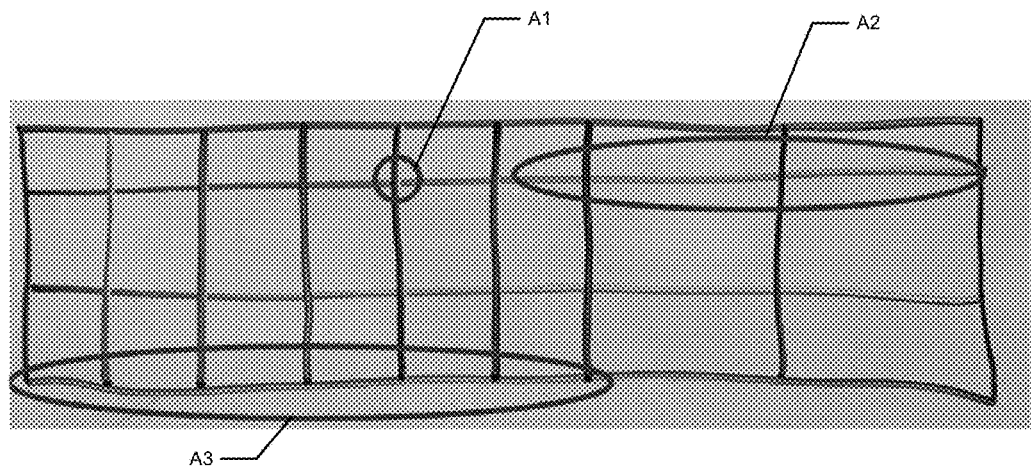
FIG. 32 shows an example of an image including a hand-drawn table on a writing board.
Figure 33:
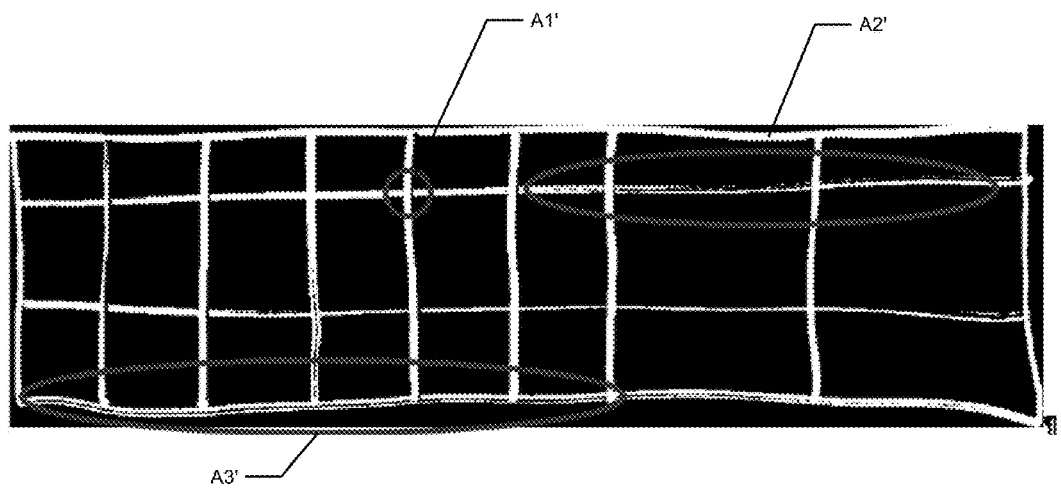
FIG. 33 shows an example of mask obtained from an image including a hand-drawn table on a writing board.

In general, one or more embodiments of the invention can recognize the content of cells in a hand-drawn table, which may contain various irregularities as discussed above with reference to FIGS. 32 and 33, by identifying the pixels that contribute to the "intent" of the line.

In general, according to one or more embodiments of the invention, a Hough line is used as a guide for tracing a table line. The Hough line may be drawn according to the Hough line transform, a known technique for detecting or identifying straight lines in an image. The Hough line may provide strong evidence for the presence of a line across all the discontinuities that may appear in a mask. Furthermore, the Hough line spans the gaps of a dashed stroke, which allows the individual dashes to be gathered as a single line instead of a collection of disparate segments.

In one or more embodiments of the invention, by using the Hough line as a guide, the table line can be traced up to the nearest discontinuity using immediate pixel connectivity. Additional portions of the line may be discovered by tracing out other intersections with the Hough line and merging these pieces together. By finding and merging all the disparate pieces that intersect with the Hough line, the intent of the line may be reproduced with a high degree of accuracy or confidence. The knowledge of the line gained to that point may then be used to find additional pieces of the line that do not intersect with the Hough line but otherwise make a good fit to the intent of the line.

Thus, one or more embodiments of the invention increase the likelihood of finding the intent of a table line compared to conventional methods, such as a simple neighboring pixel search when the lines of the mask have discontinuities or are otherwise of poor quality. Additionally, one or more embodiments of the invention can identify a table line with a dashed stroke by following the intent of the line across the gaps between dashes. Various other advantages will also be apparent from the following details of the embodiments of the invention.

Initially, according to one or more embodiments of the invention, an image is taken of a stroke drawn on a writing board. Then, a mask of the stroke in the image is obtained. The stroke may be a part of a line, a table, a chart, a graph, a text character, etc.

Next, a line tracer traces the stroke and determines a plurality of "cross edges" (i.e., pixels of the line perpendicular to the direction of the stroke) for the stroke that intersects with the Hough line. The plurality of cross edges may be broken up into one or more groups of adjacent edges. According to one or more embodiments, a class "CrossEdge" is used to record information about the pixels of a cross edge. CrossEdge may also implement methods to return the width and position (e.g., the midpoint) of the edge. For example, the gray vertical strip as shown in FIG. 6 represents a single CrossEdge for one pixel in the mask of the horizontal line.

Further, a set of the cross edges may be generated as a class "CrossEdgeSet." According to one or more embodiments, a CrossEdgeSet is a collection of zero or more CrossEdges along with currently known additional information about all of the cross edges in the set (e.g., the orientation of the line, the number of cross edges, the minimum and maximum widths, a histogram of the widths of all cross edges of the stroke, the mode width, etc.). For example, FIG. 7 shows a CrossEdgeSet including five cross edges, and FIG. 8 shows certain "additional information" about those cross edges.

Then, a class RawLine is defined. According to one or more embodiments, a RawLine is a CrossEdgeSet that represents the intent of the table line. RawLine may record additional information, such as the confidence in the line, a minimum and a maximum width, a list of intersections, etc.

Once the initial CrossEdgeSet holding all cross edges that intersect with the Hough line is established, a group of adjacent cross edges in the initial CrossEdgeSet may be expanded in a direction that the Hough line is drawn using a maximum tolerance value for the line width and a vector defined by positions of the cross edges in the group (discussed in more detail below). This expansion will look for edges adjacent to the group that do not intersect the Hough line. The expanded group (i.e., a set of existing and additional cross edges) may be added to a RawLine. In one or more embodiments of the invention, two or more groups of cross edges in the initial CrossEdgeSet may be each expanded and added to the RawLine.

When all of the groups are expanded and added to the RawLine, the entire RawLine may be expanded in a similar way at either end again using a maximum width tolerance and a vector. This second expansion looks for nearby cross edges that are not adjacent to the initial group but that complete the intent of the stroke.

Then, a gap separating two neighboring groups in the RawLine may be identified based on the maximum width tolerance value and positions of at least two cross edges of the two neighboring groups. The cross edges corresponding to the gap may be added to the RawLine. Additionally, a hole inside the line may be identified based on the maximum width tolerance value. The cross edges in the RawLine corresponding to the hole may be updated based on newly identified cross edges that bridge across the hole in the line. Furthermore, the cross edges in the RawLine at intersections of table lines may be updated based on the maximum width tolerance value. Through the above procedure, the RawLine in accordance with one or more embodiments shows a table line reflecting the intent of the original line.

Turning now to FIG. 1, a system (100) in accordance with one or more embodiments of the invention includes a buffer (110), a masking engine (120), an analysis engine (130), and a tracing engine (140). Each of these components (110, 120, 130, 140) may be located on the same computing device (e.g., personal computer (PC), laptop, tablet PC, smart phone, server, mainframe, cable box, kiosk, etc.) or may be located on different computing devices connected by a network of any size and any topology having wired and/or wireless segments.

In one or more embodiments of the invention, the system (100) includes the buffer (110). The buffer (110) may be implemented in hardware (i.e., circuitry), software, or any combination thereof. The buffer (110) may be of any size or type (e.g., memory, hard drive, etc.). The buffer (110) may store: a mask (112) of a stroke from an image; CrossEdge (114) for recording the cross edges (pixels of the line perpendicular to the direction of the stroke); CrossEdgeSet (116) as a collection of the cross edges; and a RawLine (118) as a result of line tracing.

The image may include a writing board, and a stroke may correspond to a continuous pen marking on the writing board. The mask (112) may be considered a binary image generated by applying a thresholding operation to the image capturing the writing board. As a result of the thresholding operation, irregularities of the stroke may be captured. The stroke may be represented using white pixels in the mask (112), while everything else in the mask (112) may be represented using black pixels. The mask (112) may correspond to all or only a portion of the image. The mask (112) may be generated in the system or obtained (e.g., downloaded) from any source. Further, the mask (112) may be of any size and in any format.

In one or more embodiments of the invention, the system (100) includes the masking engine (120). The masking engine (120) may be implemented in hardware (i.e., circuitry), software, or any combination thereof. The masking engine (120) may read an image capturing the writing board, and apply the thresholding operation to the image to obtain the binary image as a mask (112). The masking engine (120) may store the obtained mask (112) in the buffer (110).

In one or more embodiments of the invention, the system (100) includes the analysis engine (130). The analysis engine (130) may be implemented in hardware (i.e., circuitry), software, or any combination thereof. The analysis engine (130) may read the pixels of the mask (112) and identify a plurality of cross edges in the stroke by scanning in the positive and negative direction perpendicular to a direction of the stroke until an off pixel is encountered in the mask. In one or more embodiments of the invention, the analysis engine (130) may identify the cross edges that intersect a reference line drawn on the mask. As stated above, the reference line may be a Hough line. As discussed above, a class CrossEdge may be used to record information about the pixels of a single cross edge and implement a method in order to return its width. CrossEdge may also implement a method to return its position (e.g., midpoint). FIG. 6 shows a gray vertical strip representing a single cross edge for one pixel in the mask of the horizontal line. In this example, the CrossEdge may record 12 pixels and hence return a width of 12.

After scanning all of the pixels, the analysis engine (130) may generate a CrossEdgeSet (116) based on the CrossEdge (114). As mentioned above, CrossEdgeSet may include additional information about the cross edges in the set. FIG. 8 shows an example of such additional information for the CrossEdgeSet including five cross edges as shown in FIG. 7. "Orientation" represents an orientation of the stroke (e.g., horizontal or vertical); "num_edges" represents the number of cross edges; "width_min" represents the minimum width of cross edges; "width_max" represents the maximum width of cross edges; "width mode" represents a mode of widths; "mode_count" represents the count of the mode width; "width_mean" represents the mean of the widths; "histogram" represents a data structure including all widths and their frequencies; "beg" and "end" represent the extents of the CrossEdgeSet; and "probable_line_width_min" and "probable_line_width_max" represent the most likely minimum and maximum width of cross edges.

In the example of FIG. 7, two cross edges have width "11" and three cross edges have width "12." In that case, the analysis engine (130) may generate a data structure "11[2] 12[3]" shown as "histogram" in FIG. 8. The additional information may be updated each time a cross edge is added or removed from the CrossEdgeSet (116).

In one or more embodiments of the invention, the following methods of the class CrossEdgeSet may be used: WidthTolerances( ), ClosestGoodEdge( ), and TrailingMomentum( ).

WidthTolerances( ) sets a minimum and a maximum tolerance value for widths of cross edges that potentially belong to the CrossEdgeSet. The tolerances are computed by first computing the span from the minimum width (probable_line_width_min) to the maximum width (probable_line_width_max) of the identified cross edges. The maximum tolerance value may be a sum of half of the span and the maximum width. The minimum tolerance value may be half of the span subtracted from the minimum width.

ClosestGoodEdge( ) takes a specified cross edge as input, and finds the cross edge closest to the input cross edge, the width of which is within the tolerance values calculated by WidthTolerances( ) for the CrossEdgeSet. This allows determinations to be made about the line using reliable data.

TrailingMomentum( ) obtains a vector that identifies the momentum of a set of cross edges (or a CrossEdgeSet) at an end. The momentum is calculated by finding the vector between the midpoints of a trailing cross edge and the terminal cross edge in the CrossEdgeSet. The trailing cross edge is found by looking for the "closest good edge" by ClosestGoodEdge( ) from a cross edge that is N edges from the terminal cross edge. The terminal cross edge is found by looking for the closest good edge by ClosestGoodEdge( ) from the cross edge at the end. N is a parameter and may be set to 20, for example.

In one or more embodiments of the invention, the system (100) includes the tracing engine (140). The tracing engine (140) may be implemented in hardware (i.e., circuitry), software, or any combination thereof. The tracing engine (140) is configured to create a RawLine (118) and modify the instance based on the CrossEdgeSet (116) generated by the analysis engine (130).

In one or more embodiments of the invention, the tracing engine (140) may expand a group comprising one or more adjacent cross edges in the CrossEdgeSet (116) based on a first vector calculated from positions of at least two of the adjacent cross edges. This first expansion looks for cross edges that are adjacent to the edges in the group but do not intersect with the reference line. The expanded group is stored in the RawLine (118). In one or more embodiments of the invention, once all groups are expanded and stored in the RawLine, the tracing engine (140) may expand the RawLine (118) based on a second vector calculated from positions of at least two of the cross edges included in the RawLine (118). This second expansion looks for edges that are not adjacent to the initial group but are nearby and follow the intent of the stroke.

In one or more embodiments of the invention, the first vector may be calculated from at least (i) a position of a cross edge having a width between a minimum and a maximum tolerance value and closest to a cross edge at an end of the group and (ii) a position of a cross edge having a width between the minimum and the maximum tolerance value and apart from the cross edge at the end by a predetermined distance. In one or more embodiments of the invention, the second vector may be calculated from at least (i) a position of a cross edge having a width between the minimum and the maximum tolerance value and closest to a cross edge at an end of the RawLine (118) and (ii) a position of a cross edge having a width between the minimum and the maximum tolerance value and apart from the cross edge at the end of the RawLine (118) by the predetermined distance. As stated above, the minimum and the maximum tolerance values may be obtained through the method WidthTolerances( ), and the first and the second vectors may be obtained through the method TrailingMomentum( ).

In one or more embodiments of the invention, the tracing engine (140) may update one or more cross edges included in the RawLine (118) corresponding to an intersection of the table lines based on a maximum tolerance value of width of the stroke.

In one or more embodiments of the invention, the tracing engine (140) may identify a gap between two neighboring groups in the RawLine (118) based on the maximum width tolerance value and positions of at least two cross edges of the two neighboring groups. Each of the two neighboring groups comprises adjacent cross edges of the plurality of cross edges. The tracing engine (140) may add any cross edges corresponding to the identified gap to the RawLine (118).

In one or more embodiments of the invention, the tracing engine (140) may identify cross edges in the RawLine (118) corresponding to a hole in the stroke based on the maximum width tolerance value. Subsequently, the tracing engine (140) may identify additional cross edges corresponding to the hole, and update the RawLine (118) with the additional cross edges.

In one or more embodiments of the invention, the tracing engine (140) may expand one or more groups each comprising one or more adjacent cross edges that intersect the reference line. In that case, the tracing engine may identify the largest group (i.e., group having the greatest number of continuous cross edges), and expand the largest group first. Subsequently, the tracing engine (140) may merge the expanded largest group and another expanded group into the RawLine (118).

In one or more embodiments of the invention, the tracing engine (140) may expand the group of cross edges in a direction that the reference line (i.e., the Hough line) is drawn.

Although FIG. 1 shows the system (100) as having four components (110, 120, 130, 140), the system (100) may have more or fewer components. For example, the system (100) may include a scanner or a smart phone with a digital camera to capture the image of the writing board from which the mask (112) is generated. As another example, the system (100) may include additional engines to perform additional image processing (e.g., OCR) on the mask (112) to extract the contents (e.g., Text characters) in the mask (112).

Figure 2:
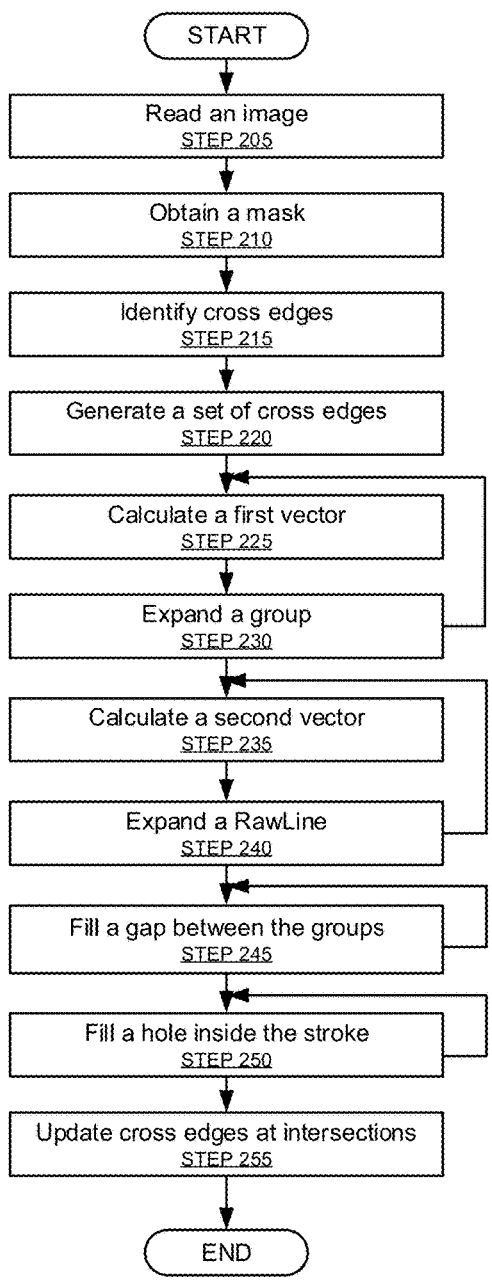
FIGS. 2-4 show a flowchart in accordance with one or more embodiments of the invention.

FIG. 2 shows a flowchart in accordance with one or more embodiments of the invention. The flowchart depicts a process for image processing. One or more of the steps in FIG. 2 may be performed by the components (110, 120, 130, 140) of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, the masking engine (120) reads an image capturing a writing board (STEP 205). The image may include a stroke of a hand-drawn table on the writing board. The image may be of any size or format. The image may be obtained from outside of the system (100). Alternatively, the image may be stored on a memory of the system (100) in advance.

In STEP 210, the masking engine (120) obtains or generates a mask (112) from the image. The mask may be of any size or format. The mask may correspond to the entire image or only a portion of the image. The masking engine (120) may store the mask (112) in the buffer (110).

In STEP 215, the analysis engine (130) identifies a plurality of cross edges on the mask by scanning in the positive and the negative direction perpendicular to a direction of the stroke. The analysis engine (130) may identify the cross edges that intersect the Hough line drawn on the mask. The analysis engine (130) may use CrossEdge (114) to record the cross edge pixels including width and positional information. The analysis engine (130) may store a CrossEdge (114) in the buffer (110).

In STEP 220, the analysis engine (130) generates an initial CrossEdgeSet (116) storing the set of all cross edges found for a stroke including additional information about the identified cross edges. The analysis engine (130) may store the CrossEdgeSet (116) in the buffer (110). The initial CrossEdgeSet (116) may identify all the cross edges that intersect with the Hough line and may be broken up into one or more groups of adjacent edges.

In STEP 225, the tracing engine (140) calculates a first vector for a group of adjacent edges in the initial CrossEdgeSet based on positions of at least two cross edges in the group. As discussed above, the first vector may be a vector that identifies the momentum of the cross edges included in the group at an end.

In STEP 230, the tracing engine (140) expands a group of adjacent edges in the initial CrossEdgeSet (116) based on the first vector. The group is expanded to include cross edges adjacent to the group that may not intersect with the Hough line, as illustrated in the example discussed below. The tracing engine (140) may add each expanded group to a RawLine (118). STEPs 225 and 230 may be repeated for additional groups comprising adjacent cross edges in the initial CrossEdgeSet (116).

In STEP 235, the tracing engine (140) calculates a second vector based on positions of at least two of the cross edges in the RawLine (118). As discussed above, the second vector may be a vector that identifies the momentum of the cross edges in the RawLine (118) at an end.

In STEP 240, the tracing engine (140) expands the RawLine (118) based on a second vector calculated from positions of at least two of the cross edges included in the RawLine (118). This expansion will look for nearby edges that complete the intent of the stroke. The tracing engine (140) may store the expanded RawLine (118) in the buffer (110). STEPs 235 and 240 may be repeatedly executed to find as many nearby edges as possible. Details of the algorithm to find the nearby edges are described later.

Figure 3:
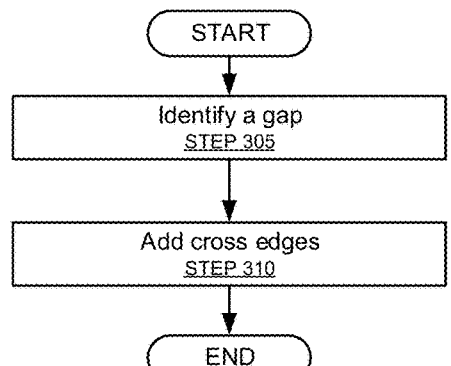

In STEP 245, the tracing engine (140) fills a gap between two neighboring groups of cross edges in the RawLine (118). This step may be separated into multiple steps as shown in FIG. 3. In STEP 305, the tracing engine (140) identifies a gap separating two neighboring groups in the RawLine (118), each comprising one or more adjacent cross edges, based on the maximum width tolerance value and positions of at least two cross edges of the two neighboring groups. Subsequently, in STEP 310, the tracing engine (140)

adds any cross edges corresponding to the identified gap to the RawLine (118). STEP 245 may be repeatedly executed to fill gaps between other neighboring groups.

Figure 4:
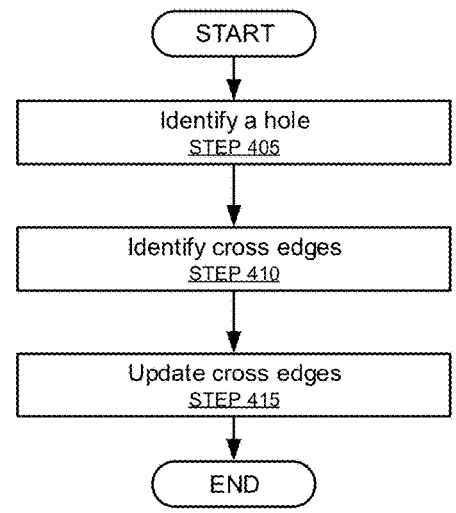

In STEP 250, the tracing engine (140) fills a hole inside a stroke (or line) in the RawLine (118). This step may be separated into multiple steps as shown in FIG. 4. In STEP 405, the tracing engine (140) identifies the cross edges of the RawLine (118) corresponding to the hole in the line based on the maximum width tolerance value. In STEP 410, the tracing engine (140) identifies additional cross edges on the other side of the hole. In STEP 415, the tracing engine (140) updates the identified cross edges of the RawLine (118) with the additional cross edges. STEP 250 may be repeatedly executed to fill other holes inside the stroke in the RawLine (118).

Finally, in STEP 255, the tracing engine (140) updates one or more cross edges in the RawLine (118) corresponding to an intersection of the stroke based on a maximum tolerance value of the width of the stroke.

Figure 9:
FIGS. 9-30 show an example of line tracing in accordance with one or more embodiments of the invention.

FIG. 5 shows an example of an algorithm to trace lines of a hand-drawn table in accordance with one or more embodiments of the invention. With reference to FIG. 5 and FIGS. 9-30 showing visual examples, the details of the algorithm executed by the analysis engine (130) and tracing engine (140) are described below. In this example, the mask shown in FIG. 9 has been obtained by the masking engine (120) and stored in the buffer (110). As shown in the figure, the input has irregularities including broken parts and cracks.

Figure 10:
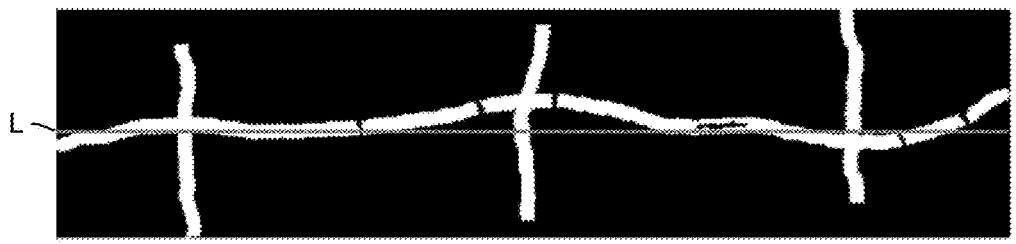
Figure 11:
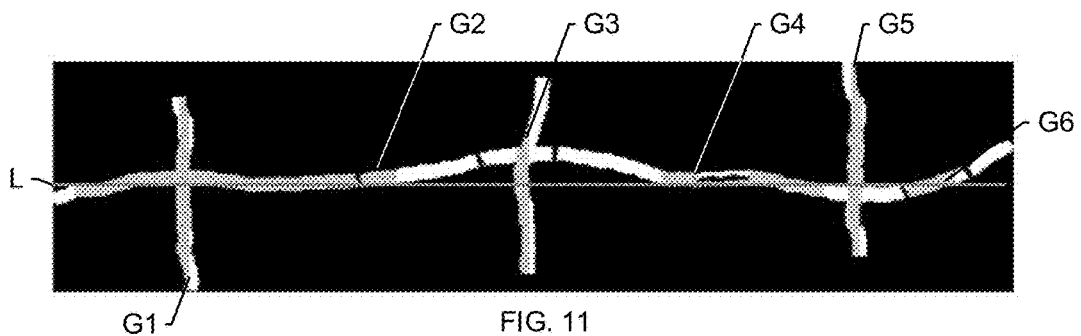

At the first step of the algorithm in accordance with one or more embodiments, the analysis engine (130) builds a Hough line CrossEdgeSet based on the Hough line L drawn on the mask (112) as shown in FIG. 10 (LINE 01). In particular, the analysis engine (130) identifies all cross edges of the stroke that intersect the Hough line L as a reference line (shown as gray regions in FIG. 11). Then, the analysis engine (130) creates instances of CrossEdge (114) corresponding to the identified cross edges, and creates a CrossEdgeSet (116) including the CrossEdges (114).

Figure 12:

At LINE 02, the tracing engine (140) initializes a RawLine (118) to the largest collection or group of connected (adjacent) edges in the Hough line CrossEdgeSet (116). As stated above, the RawLine (118) is a CrossEdgeSet that represents the intent of the table line. This example includes six groups of cross edges (i.e., Groups G1-G6 in the CrossEdgeSet (116)), and G1 is the largest group having the largest number of cross edges. Thus, the RawLine (118) is initialized so as to include the Group G1, as shown in FIG. 12.

Figure 13:
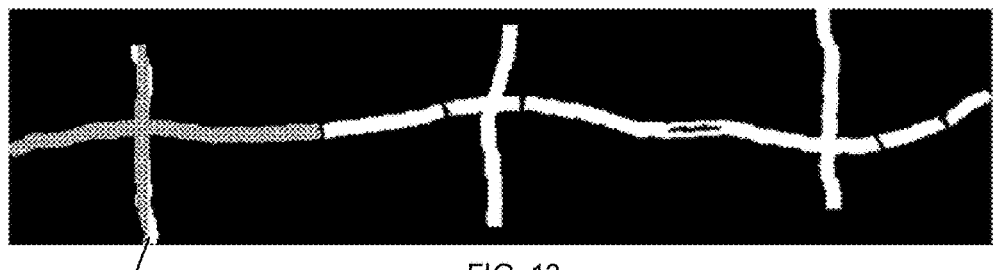

At LINE 03, the tracing engine (140) expands the edges of the RawLine (118) in either direction, using the TrailingMomentum( ). The tracing engine (140) may compute the TrailingMomentum( ) of the line at either end, and look for any additional adjacent cross edges that can be found along the momentum vector. The tracing engine (140) may search for cross edges up to N pixels away from the current edge. N is equal to 1 in this example, but any other value may be used. After the expansion of the largest group G1, the RawLine (118) grows as shown in FIG. 13, which includes the expanded group G1'.

Figure 14:
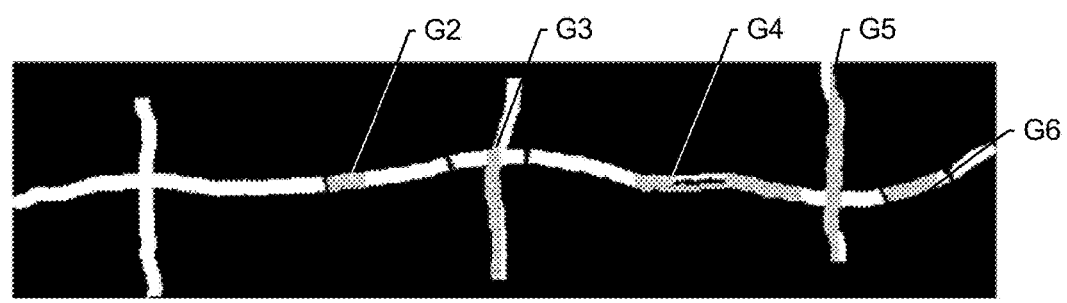

At LINE 04, the tracing engine (140) subtracts the newly expanded edges of the RawLine (i.e., Group G1') from the Hough line CrossEdgeSet (116). This removes the cross edges discovered from the Hough line CrossEdgeSet (116) so that the tracing engine (140) may focus only on what remains. FIG. 14 shows the remaining groups (i.e., Groups G2-G6 in the Hough line CrossEdgeSet (116)).

At LINE 05, it is determined whether the Hough line CrossEdgeSet (116) still has cross edges. If yes, LINEs 06-10 are repeated. Here, because there are five groups remaining in the CrossEdgeSet (116), the process enters the loop.

Figure 15:
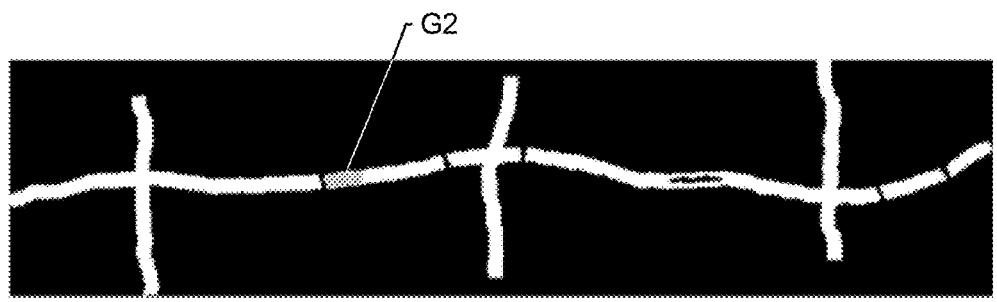

At LINE 06, the tracing engine (140) locates the closest group of continuous cross edges in the Hough line CrossEdgeSet (116) to the existing RawLine (118). Here, the tracing engine (140) may locate Group G2, which is the closest group in the CrossEdgeSet (116) to the current RawLine (118) including Group G1'. Group G2 is shown in FIG. 15.

Figure 16:
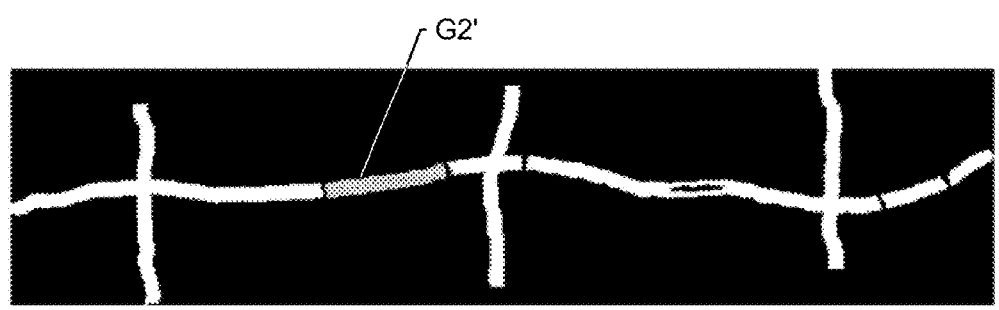

At LINE 07, the tracing engine (140) expands the closest group in either direction in the same fashion as LINE 03. As a result, Group G2 is expanded to Group G2', as shown in FIG. 16.

Figure 17:
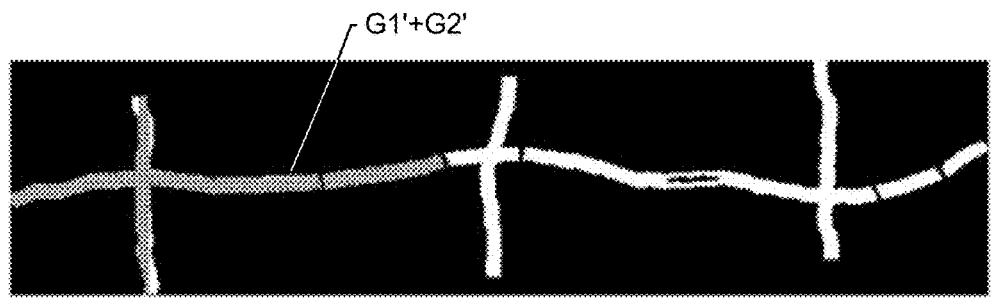

At LINE 08, it is determined whether the extended closest group and the existing RawLine (118) may be merged. At LINE 09, if it is determined that the extended closest group and the existing RawLine (118) may be merged, the tracing engine (140) merges the expanded closest group into the RawLine (118). Here, the tracing engine (140) may compare the two sets of the cross edges (i.e., Groups G1' and G2') and determine that both may be merged. The tracing engine (140) may merge the cross edges and save them as the RawLine (118). FIG. 17 shows the merged RawLine (118).

Figure 18:
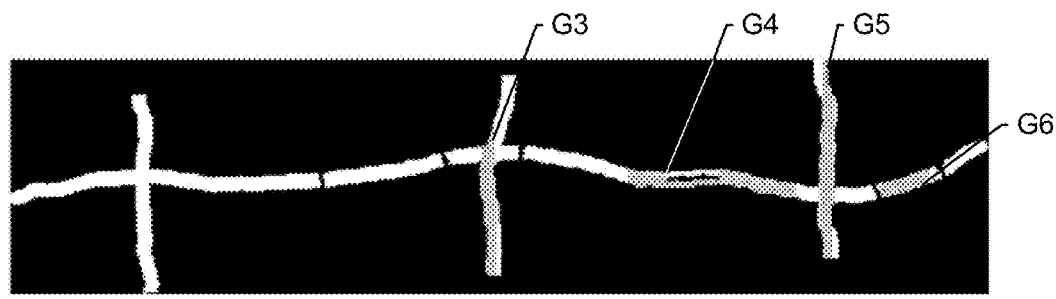

At LINE 10, the tracing engine (140) subtracts the expanded closest group from the Hough line CrossEdgeSet (116). Here, Group G2' is subtracted from the CrossEdgeSet (116), as shown in FIG. 18.

The process then returns to LINE 05, and repeats the loop until the Hough line CrossEdgeSet (116) becomes empty. In this example, four groups G3-G6 of cross edges still remain in the Hough line CrossEdgeSet (116). Thus, the process repeats the loop.

Figure 19:
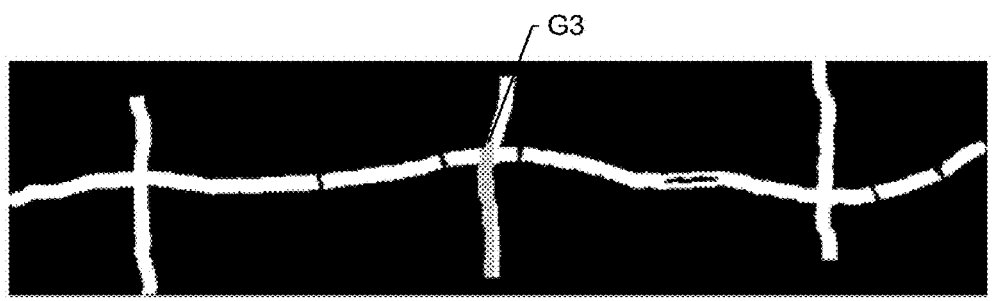
Figure 20:
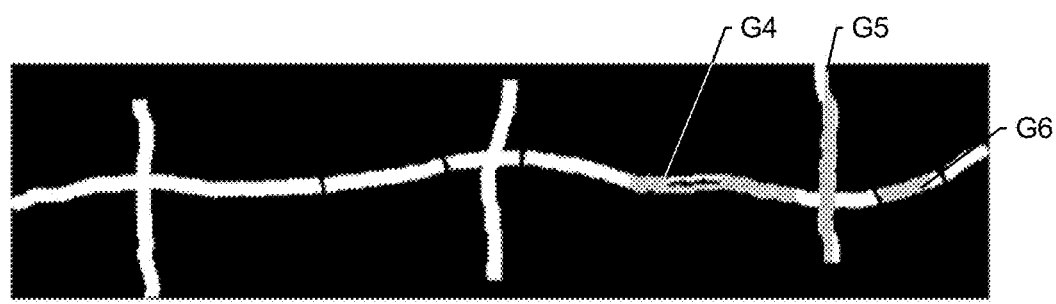

Here, Group G3 is located as the closest group of continuous Hough line CrossEdges to the existing RawLine (118), as shown in FIG. 19 (LINE 06). Next, the tracing engine (140) tries to expand Group G3 in either direction (LINE 07). However, in this case, the tracing engine (140) does not find any additional edges because following the momentum from the middle of the cross edges at both ends of the group does not result in discovery of any additional cross edges. Subsequently, the tracing engine (140) may determine whether the closest group and the existing RawLine can be merged (LINE 08), but it determines that merging is not possible. Finally, as shown in FIG. 20, the tracing engine (140) subtracts Group G3 from the Hough line CrossEdgeSet (116) (LINE 10).

Figure 21:
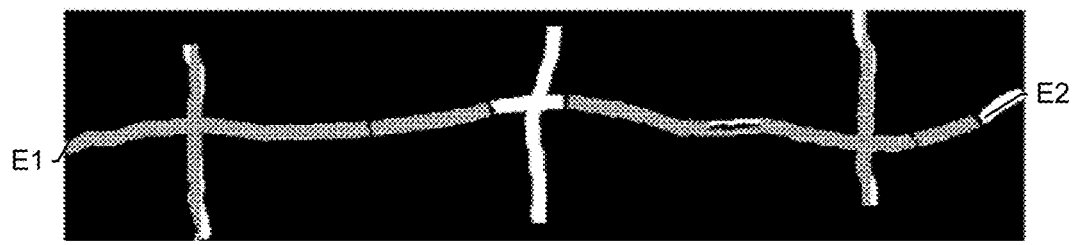

This process continues in the loop, until no more Hough line CrossEdgeSet edges remain. In this example, the RawLine (118) grows as shown in FIG. 21.

Because the RawLine (118) that has been built to this point is based on the CrossEdges that intersected with the Hough line L and their adjacent neighbors, there is reasonable confidence that the span of the current RawLine (118) indeed follows the intent of the line. At the next stage, the algorithm tries to find more CrossEdges in the mask by expanding the RawLine (118) at either end if possible (LINE 11).

At LINEs 12-13, the tracing engine (140) computes the midpoint of the closest good edge at an end of the line and the trailing momentum at the end using the methods ClosestGoodEdge( ) and TrailingMomentum( ). Subsequently, the tracing engine (140) may repeat the calculation at LINEs 15-22 while the midpoint is within the bounds of the mask.

At LINE 15, the tracing engine (140) increments the midpoint by one pixel along the direction of the momentum. At LINE 16, the tracing engine (140) looks for a CrossEdge that is not part of the RawLine (118) at the current midpoint. At LINE 17, it is determined whether a CrossEdge is found. If so, at LINE 18, the tracing engine (140) adds the CrossEdge to a new CrossEdgeSet, and expands in either direction in a similar fashion as LINE 03 above. At LINE 19, it is determined if the expanded new CrossEdgeSet and the existing RawLine (118) may be merged. If so, at LINEs 20-22, the tracing engine (140) merges the expanded closest group into the RawLine (118), computes the midpoint of the ClosestGoodEdge( ) to the new end of the RawLine (118), and computes the TrailingMomentum( ) at the end. The calculation at LINEs 15-22 is repeated while the midpoint is within the bounds of the mask (112).

Figure 22:
Figure 23:

In the example shown in FIG. 21, there is no room at the left end E1, but more edges can be picked up at the right end E2. Thus, the tracing engine (140) computes the TrailingMomentum( ) at the right end of the line, and then follows that vector sweeping out a width of the upper bound of the WidthTolerances( ) looking for additional edges, as shown in FIG. 22. When the tracing engine (140) locates the first CrossEdge, the tracing engine (140) adds it to a new CrossEdgeSet which is again expanded in either direction using the TrailingMomentum( ) of the segment looking for edges N pixels away. The tracing engine (140) may determine whether the RawLine (118) and the newly discovered CrossEdgeSet can be merged. FIG. 23 shows an example of the result that the right end of the RawLine has been expanded.

Figure 24:
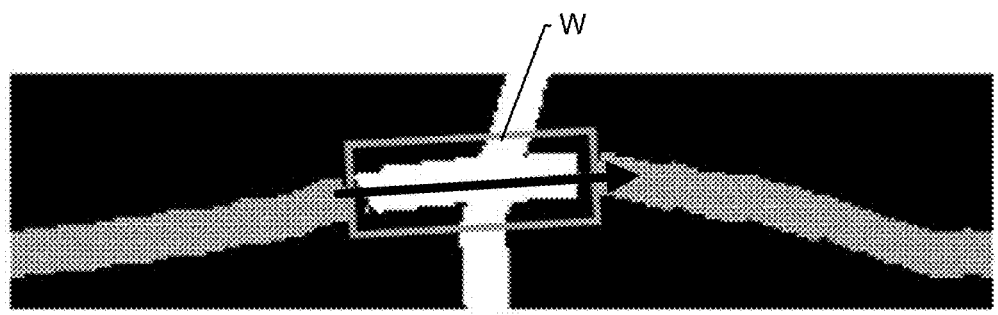
Figure 26:
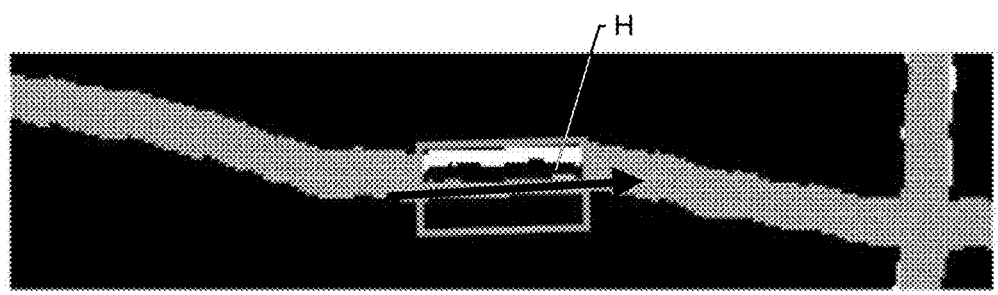

Once the tracing engine (140) has expanded the edges of the RawLine (118) to the extent possible, the tracing engine (140) focuses on the interior of the RawLine (118) and tries to fill gaps and holes of the RawLine (118), as shown in FIGS. 24 and 26. The tracing engine (140) scans the cross edges from one end of the RawLine (118) to the other (hereinafter called every possible cross edge C) looking to fill the gap or hole (LINEs 23-34).

At LINEs 25-30, the tracing engine (140) fills a gap inside the line, as shown in FIG. 24. If the tracing engine (140) finds a gap in the line, the tracing engine (140) searches for cross edges in a window W with a height equal to the maximum tolerance value calculated by WidthTolerances( ), which is centered on a line between the midpoints of the two ends of the gap. The tracing engine (140) may add any edges found in the window to the RawLine (118).

Figure 25:
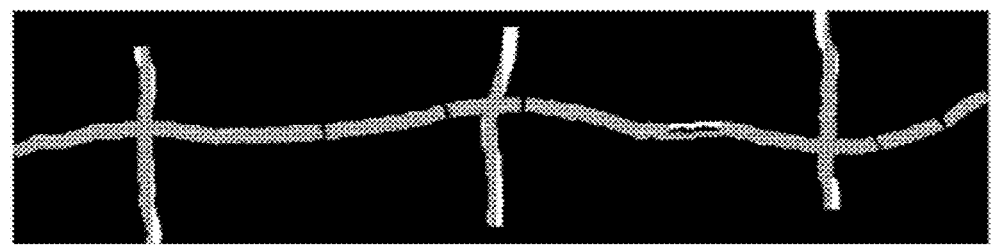

At LINE 25, it is determined whether the RawLine is missing a CrossEdge at C. If so, at LINE 26, the tracing engine (140) continues searching until it finds a non-empty CrossEdge. This operation may identify a gap G of one or more cross edges. At LINE 27, the tracing engine (140) may locate the ClosestGoodEdge( ) at either side of G (hereinafter called CrossEdges P and Q). At LINE 28, the tracing engine (140) constructs a line M that goes from the midpoint of P to the midpoint of Q. Then, at LINE 29, using a window centered on M that is as wide as the upper bound of WidthTolerances( ), the tracing engine (140) searches for CrossEdges along M, incrementally moving outwards from M. Finally, at LINE 30, it is determined whether a CrossEdge is found, and if so, the tracing engine (140) adds the CrossEdge to the RawLine (118). FIG. 25 shows the result of this filling operation (LINEs 25-30).

The tracing engine (140) may find additional edges for an area of the RawLine (118) that already has edges. This can occur when there is a hole H in the line, as shown in FIG. 26. Because the width of this region is less than the expected width of the line, this area is scanned on both sides for additional edges that might complete the line. The new CrossEdges are merged with the existing edges in the RawLine (118) up to a width equal to the maximum tolerance value of the WidthTolerances( ).

Figure 27:
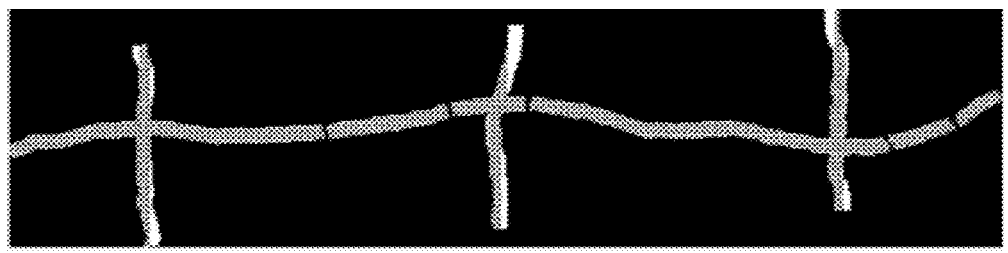

At LINE 31, it is determined whether the RawLine (118) has a CrossEdge at C and the width of the CrossEdge is less than the upper bound of WidthTolerances( ). If so, at LINE 32, the tracing engine (140) computes the number of expected pixels E which is the CrossEdge width subtracted from the maximum tolerance value of WidthTolerances( ). At LINE 33, the tracing engine (140) scans along the CrossEdge from both ends E pixels to look for additional CrossEdges. At LINE 34, it is determined whether an additional CrossEdge is found and the width of the union of the two CrossEdges is less than the upper bound of WidthTolerances( ). If so, the tracing engine (140) replaces the CrossEdge with the union. FIG. 27 shows the result of this replacing operation (LINEs 31-34).

Figure 28:
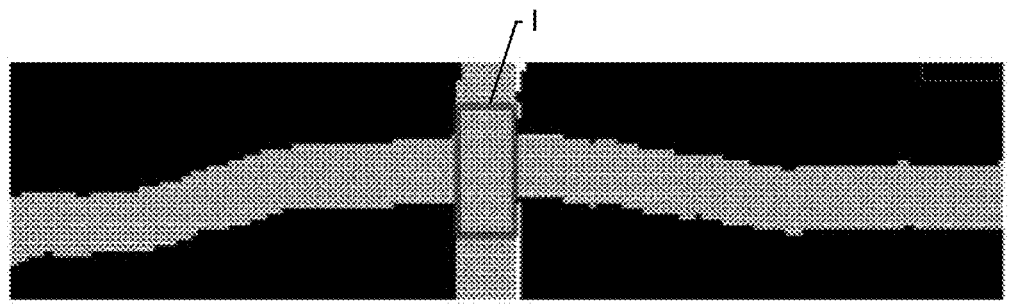

At LINEs 35-38, the tracing engine (140) updates the cross edges in the RawLine (118) that are possible intersections with other lines, as shown in FIG. 28. The tracing engine (140) may locate such cross edges by looking for groups of edges in the RawLine (118) that exceed the WidthTolerances( ).

Figure 29:
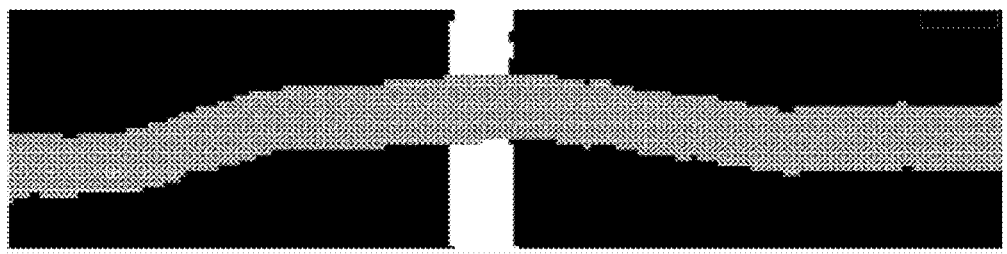
Figure 30:
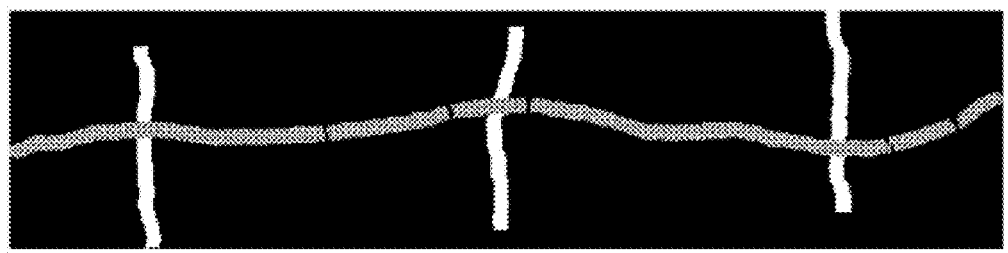

At LINE 37, the tracing engine (140) locates an intersection, which is a region of the line where the width changes significantly and is a likely region of the RawLine (118) where another line of the table overlaps. At LINE 38, it is determined whether an intersection is located. If so, the tracing engine (140) removes the cross edges corresponding to the intersection from the RawLine (118), and adds an interpolated set of CrossEdges through the intersection. FIG. 29 shows the result of this operation. The cross edges in the RawLine (118) corresponding to the intersection are updated with the new cross edges having the width of adjacent cross edges. This process repeats for all intersections found in the RawLine (118). FIG. 30 shows the result when the process completes the operations.

Figure 31:
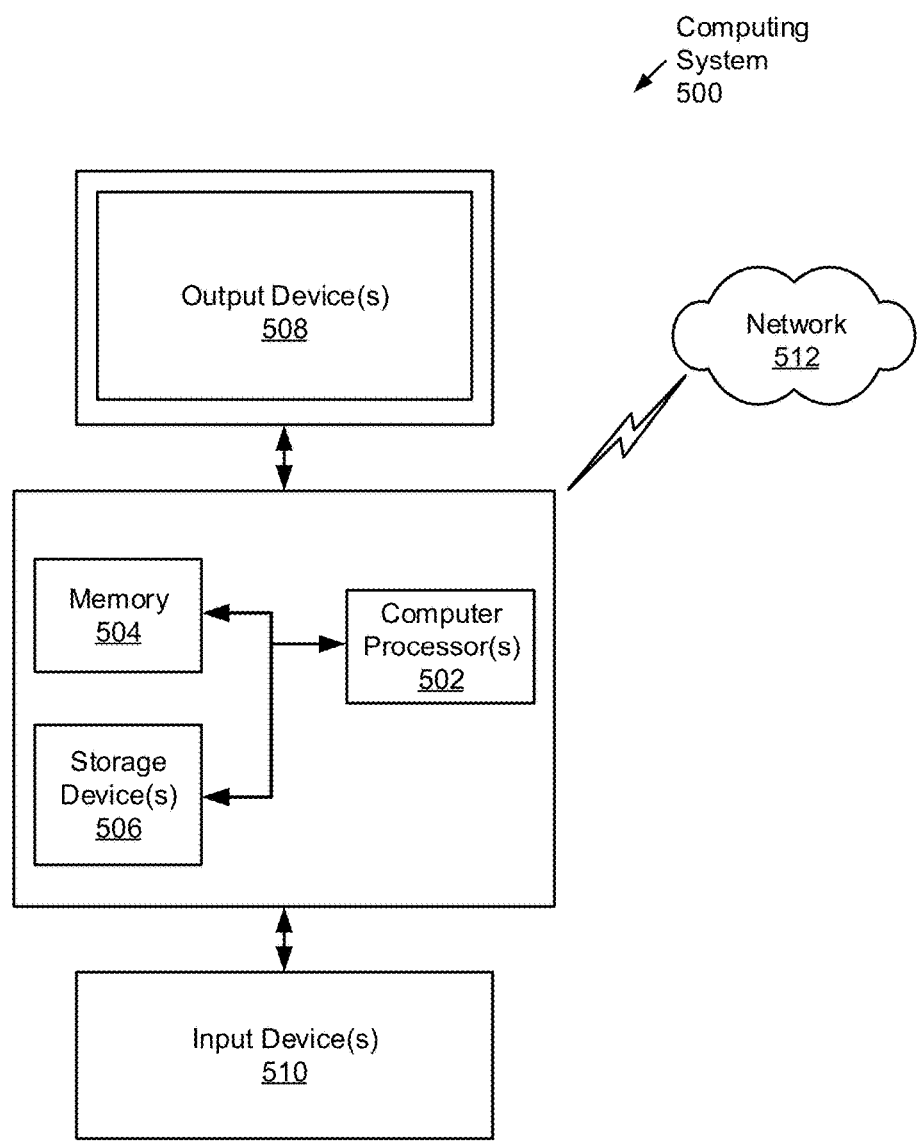
FIG. 31 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 31, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing, comprising:
   obtaining a mask of an image comprising a stroke with edges;
   determining a reference line intersecting at least one portion of the stroke;
   identifying a plurality of cross edges for the stroke based on the mask and the reference line,
   wherein the plurality of cross edges comprises a group of adjacent cross edges determined by scanning the mask in a positive direction and a negative direction perpendicular to the reference line until reaching the edges of the stoke in the mask;
   expanding the group, comprising:
      (a) calculating a first vector based on positions of at least two of the cross edges in the group; and
      (b) expanding the group, based on the first vector, to include cross edges adjacent to the group that do not intersect the reference line; and
   expanding the expanded group, comprising:
      (c) calculating a second vector based on positions of at least two of the cross edges in the expanded group; and
      (d) expanding the expanded group, based on the second vector, to include a second group of adjacent cross edges nearby the expanded group that do not intersect the reference line.

2. The method according to claim 1, wherein the second group of adjacent cross edges nearby the expanded group in the step (d) are separated from the expanded group by no more than the shorter of a length of the second group and a length of the expanded group.

3. The method of claim 1, further comprising:
   updating the cross edges in the expanded group corresponding to an intersection of table lines based on a maximum tolerance value of a width of the stroke.

4. The method of claim 1, wherein the plurality of cross edges further comprises a neighboring group of adjacent cross edges, and the method further comprises:
   identifying a gap between the group and the neighboring group based on a maximum tolerance value of a width of the stroke and positions of at least two of the cross edges in the groups; and
   adding cross edges corresponding to the gap to the plurality of cross edges.

5. The method of claim 1, further comprising:
   identifying cross edges of the expanded group corresponding to a hole in the stroke based on a maximum tolerance value of a width of the stroke;
   identifying additional cross edges corresponding to the hole; and
   updating the identified cross edges with the identified additional cross edges.

6. The method of claim 1, wherein the first vector is calculated from at least:
   a first position of a cross edge having a width between a minimum and a maximum tolerance value and closest to a cross edge at an end of the group; and
   a second position of a cross edge having a width between the minimum and the maximum tolerance value and separated from the cross edge at the end by a predetermined distance.

7. The method of claim 1, wherein the second vector is calculated from at least:
   a first position of a cross edge having a width between the minimum and the maximum tolerance value and closest to a cross edge at an end of the expanded group; and
   a second position of a cross edge having a width between the minimum and the maximum tolerance value and separated from the cross edge at the end by the predetermined distance.

8. The method of claim 1, wherein the plurality of cross edges further comprises additional groups of adjacent cross edges, and each of the groups is expanded by the steps (a) and (b) beginning with the group having the greatest number of adjacent cross edges.

9. The method of claim 8, further comprising: merging the expanded group having the greatest number of adjacent cross edges and the closest of the groups expanded by the steps (a) and (b).

10. The method of claim 1, wherein the reference line is a Hough line drawn on the mask, the plurality of cross edges identified represents a part of the stroke crossing the Hough line, and the group of cross edges is expanded in a direction of the Hough line.

11. A non-transitory computer readable medium (CRM) storing computer readable program code embodied therein that:
   obtains a mask of an image comprising a stroke with edges;

determines a reference line intersecting at least one portion of the stroke;
identifies a plurality of cross edges for the stroke based on the mask and the reference line,
wherein the plurality of cross edges comprises a group of adjacent cross edges determined by scanning the mask in a positive direction and a negative direction perpendicular to the reference line until reaching the edges of the stoke in the mask; and
expands the group by:
(a) calculating a first vector based on positions of at least two of the cross edges in the group; and
(b) expanding the group, based on the first vector, to include cross edges adjacent to the group that do not intersect the reference line; and
expands the expanded group by:
(c) calculating a second vector based on positions of at least two of the cross edges in the expanded group; and
(d) expanding the expanded group, based on the second vector, to include a second group of adjacent cross edges nearby the expanded group that do not intersect the reference line.

12. The non-transitory CRM of claim 11, wherein the second group of adjacent cross edges nearby the expanded group in the step (d) are separated from the expanded group by no more than the shorter of a length of the second group and a length of the expanded group.

13. The non-transitory CRM of claim 11, further storing computer readable program code embodied therein that:
updates the cross edges in the expanded group corresponding to an intersection of table lines based on a maximum tolerance value of a width of the stroke.

14. The non-transitory CRM of claim 11, wherein the plurality of cross edges further comprises a neighboring group of adjacent cross edges, and the non-transitory CRM further stores computer readable program code embodied therein that:
identifies a gap between the group and the neighboring group based on a maximum tolerance value of a width of the stroke and positions of at least two cross edges in the groups; and
adds cross edges corresponding to the gap to the plurality of cross edges.

15. The non-transitory CRM of claim 11, further storing computer readable program code embodied therein that:
identifies cross edges of the expanded group corresponding to a hole in the stroke based on a maximum tolerance value of a width of the stroke;
identifies additional cross edges corresponding to the hole; and
updates the identified cross edges with the identified additional cross edges.

16. The non-transitory CRM of claim 11, wherein the first vector is calculated from at least:
a first position of a cross edge having a width between a minimum and a maximum tolerance value and closest to a cross edge at an end of the group; and
a second position of a cross edge having a width between the minimum and the maximum tolerance value and separated from the cross edge at the end by a predetermined distance.

17. The non-transitory CRM of claim 11, wherein the second vector is calculated from at least:
a first position of a cross edge having a width between the minimum and the maximum tolerance value and closest to a cross edge at an end of the expanded group; and
a second position of a cross edge having a width between the minimum and the maximum tolerance value and separated from the cross edge at the end by the predetermined distance.

18. The non-transitory CRM of claim 11, wherein the plurality of cross edges further comprises additional groups of adjacent cross edges, and each of the groups is expanded by the steps (a) and (b) beginning with the group having the greatest number of adjacent cross edges.

19. The non-transitory CRM of claim 18, further storing computer readable program code embodied therein that merges the expanded group having the greatest number of adjacent cross edges and the closest of the groups expanded by the steps (a) and (b).

20. The non-transitory CRM of claim 11, wherein
the reference line is a Hough line drawn on the mask,
the plurality of cross edges identified represents a part of the stroke crossing the Hough line, and
the group of cross edges is expanded in a direction of the Hough line.

21. An image processing system comprising:
a memory; and
a processor that:
obtains a mask of an image comprising a stroke with edges;
stores the mask in the memory;
determines a reference line intersecting at least one portion of the stroke in the mask:
identifies a plurality of cross edges for the stroke based on the mask and a reference line drawn on the mask,
wherein the plurality of cross edges comprises a group of adjacent cross edges determined by scanning the mask in a positive direction and a negative direction perpendicular to the reference line until reaching the edges of the stoke in the mask; and
expands the group by:
(a) calculating a first vector based on positions of at least two of the cross edges in the group; and
(b) expanding the group, based on the first vector, to include cross edges adjacent to the group that do not intersect the reference line; and
expands the expanded group by:
(c) calculating a second vector based on positions of at least two of the cross edges in the expanded group; and
(d) expanding the expanded group, based on the second vector, to include a second group of adjacent cross edges nearby the expanded group that do not intersect the reference line.

* * * * *